United States Patent [19]
Hara et al.

[11] Patent Number: 5,646,493
[45] Date of Patent: Jul. 8, 1997

[54] ROBOT PROFILE CONTROL METHOD

[75] Inventors: Ryuichi Hara, Fujiyoshida; Ichiro Kanno, Oshino-mura, both of Japan

[73] Assignee: Fanuc Ltd., Yamanashi, Japan

[21] Appl. No.: 446,299

[22] Filed: May 22, 1995

[30]     Foreign Application Priority Data

May 20, 1994   [JP]   Japan ..................... 6-129866

[51] Int. Cl.$^6$ ........................................... B25J 9/10
[52] U.S. Cl. .................. 318/568.17; 318/568.18; 318/571; 364/474.03; 364/474.06; 395/95
[58] Field of Search ........................ 318/560–574, 318/432–434; 384/474.03, 474.06, 474.12, 474.14, 474.15, 474.16, 474.17, 474.18, 474.3, 474.35; 395/95, 96, 97; 901/9, 34; 409/145–155, 186–188, 190, 191, 193–195; 408/11

[56]         References Cited

U.S. PATENT DOCUMENTS

| | | | |
|---|---|---|---|
| 4,666,352 | 5/1987 | Nagao et al. | 364/474 X |
| 4,808,063 | 2/1989 | Haley | 414/730 |
| 4,894,788 | 1/1990 | Stlzer | 364/513 |
| 4,967,126 | 10/1990 | Gretz et al. | 318/568.19 |
| 5,129,044 | 7/1992 | Kashiwagi et al. | 395/86 |
| 5,130,632 | 7/1992 | Ezawa et al. | 318/568.11 |
| 5,206,930 | 4/1993 | Ishikawa et al. | 395/95 |
| 5,265,195 | 11/1993 | Jinno et al. | 395/96 |
| 5,276,390 | 1/1994 | Fisher et al. | 318/568.1 |
| 5,418,441 | 5/1995 | Furukawa | 318/568.22 |
| 5,475,291 | 12/1995 | Yoshida et al. | 318/568.22 |

*Primary Examiner*—Brian Sircus
*Attorney, Agent, or Firm*—Staas & Halsey

[57]         ABSTRACT

A method of obtaining a force of each axis of a robot from the product of positional deviation and positional gain. A vector having components of the forces as many as the number of axes is defined and transformed into a vector on the base coordinate system. Based on the vector, a normal line vector on the profiling object plane is determined. The attitude of the robot is controlled so that the direction of the normal line vector may coincide with the Z axis of the tool coordinate system. Next, the positional gain of each axis, which would serve to make the force in the direction of the normal line vector constant, is determined, with the position deviation fixed. Further, the tangential direction of the moving path at the position is obtained, and the moving target position of the robot is determined in that direction. Then, the amount to be added to the position deviation of each axis, which is required to realize the speed for moving the robot RB toward this moving target position, is calculated, and is added to a positional deviation calculation section of a position control loop.

6 Claims, 5 Drawing Sheets

ROBOT PROFILE CONTROL METHOD

BACKGROUND OF THE INVENTION

1. Field of the Invention

The present invention relates to a robot control method, and more in detail, to a robot control method which realizes a profile control on a working object surface for burr removing work or the like.

2. Description of the Related Art

In profiling a curved surface as a working object for working such as burr removing work using an industrial robot, it is sometimes required that, when a tool is pressed to the surface, the force component of the reaction force in, a normal direction to the surface should always be kept constant in order to realize an accurate working.

In order to meet such requirements, the following methods have been executed conventionally;

(1) work is performed while pressing a robot against a working object surface by providing the robot with a constant strength using a mechanical means, or (2) force which a robot receives from a working object surface or distance between a working object surface and the robot is maintained constant by using a force sensor or a distance sensor.

However, in the above mentioned method (1), since the normal direction of a curved surface becomes different if the position on the curved surface changes, the force which the robot actually receives changes at every position. As a result, a troublesome minute instruction is required for executing a profile control with high accuracy. Also, in the above mentioned method (2) by using a force sensor for exclusive use, it becomes an issue that the sensor is expensive, peripheral devices such as a mechanism for attaching a sensor and a signal processing circuit are required so that they become obstructive at the time of attaching a large size burr removing working tool, and further, a reliability of the system is influenced by the tolerance of the sensor.

OBJECTS AND SUMMARY OF THE INVENTION

It is an object of the present invention to provide a robot control method which enables realization of a profile control without mounting a profiling sensor for exclusive use such as a force sensor or a distance sensor. Particularly, the robot control method according to the present invention is devised so as to constitute a system which is low in price and is high in reliability in an application requiring profile control, and furthermore, the profile control can be realized by a floating function using software means.

A principle of the present invention will be described hereinafter with reference to FIG. 1.

FIG. 1 comprises schematic diagrams showing generally a robot executing profile control. In FIG. 1, a robot RB has a first axis J1 to an N-th axis Jn, and a tool I (for example, a burr removing tool) is attached to the phase plate surface of the tip thereof through an appropriate attaching mechanism (not shown). Incidentally, a point of shown in FIG. 1 is the center of the phase plate. A tool coordinate system of X, Y, Z orthogonal three axes is set on the tool center point (hereinafter referred to as TCP) Ot of the tool I. An origin of the tool coordinate system is set at the TCP Ot of the tool I, and the Z axis thereof is set so as to coincide with the line connecting points Ot-Of.

The TCP Ot of the tool always contacts with a profiling object plane $\Gamma$ (a curved surface in general), and the robot RB and the profiling object plane $\Gamma$ exert mutual forces having directions which oppose each other and magnitudes which are identical each other.

As shown in FIG. 1, it is considered that the robot RB is instructed so that the TCP Ot of the tool directed from a point P1 to P2 along the path shown by the dotted line. At present, it is considered that the advancing direction of the TCP Ot of the tool is the tangential direction of the path shown by the dotted line, that is, a direction of the arrow H, and the moving velocity is designated with an instructed moving velocity v. Also, the normal vector of the profiling object plane $\Gamma$ at the portion contacting with the TCP Ot of the tool at this occasion is defined as <N>.

Hereinafter, the symbol is enclosed with "< >" in order to indicate that the symbol is a vector.

The profile control according to the present invention realizes (1) maintaining at a constant value the absolute value W (=|<W>|) of the component <W>, normal to the profiling object plane $\Gamma$, of the force in which the robot RB receives from the profiling object plane $\Gamma$, and (2) making the Z axis direction of the tool coordinate system coincide with a normal line direction of the profiling object plane $\Gamma$.

On this occasion, there is known generally that, when an external force and a moment are applied to an end effector, the statistical relation between force and moment applied to respective joint is represented with the following equation.

If the end effector is represented as the position vector <Pn+1> on the base coordinate system $\Sigma 0$, and an external force <Fn+1> and a moment <Mn+1> are applied to the end effector, the moment Mi and force Fi applied to the i-th joint in order to bear them are represented as follows;

$$Mi = <Zi-1^{(o)}> \cdot ((<Pn+1^{(o)}> - <Pi-1^{(o)}>) \times <Fn+1^{(o)}> + <Mn+1^{(o)}>) \quad (1)$$

$$Fi = <Zi-1^{(o)}> \cdot <Fn+1^{(o)}> \quad (2)$$

where, $<Zi-1^{(o)}>$; the unit vector in the axial direction of the (i−1)-th joint, expressed by the base coordinate system $\Sigma 0$, $<Pn+1^{(o)}>$; the position vector directed from the origin of the base coordinate system $\Sigma 0$ to the origin of the coordinate system $\Sigma n+1$ set on the end effector, expressed by the base coordinate system $\Sigma 0$, $<Pi-1^{(o)}>$; the position vector directed from the origin of the base coordinate system $\Sigma 0$ to the origin of the coordinate system $\Sigma n+1$ set on the (n−1)-th joint, expressed by the base coordinate system $\Sigma 0$.

$<Fn+1^{(o)}>$; the external force <Fn+1> expressed by the base coordinate system $\Sigma 0$, $<Mn+1^{(o)}>$; the moment <Mn+1> expressed by the base coordinate system in the above equations (1) and (2), the values of vectors $<Zi-1^{(o)}>$, $<Pn+1^{(o)}>$, $<Pi-1^{(o)}>$ on the three-dimensional space defined with the base coordinate system $\Sigma 0$ of the robot can be obtained individually. Further, the moment Mi and the external force Fi can be obtained from the product of the position deviation and the positional gain at the i-th joint.

As apparent from the above, the unknown quantities in the equations (1) and (2) are only $<Fn+1^{(o)}>$ and $<Mn+1^{(o)}>$. However, these values can finally be obtained also. That is, the base coordinate $\Sigma 0$ expressions of the force $<Fn+^{(o)}>$ and the moment $<Mn+1^{(o)}>$ applied to the end effector can be obtained by calculating the product of the positional deviation and the positional gain at the respective joint.

Moreover, since the positional deviation detected at respective joint Ji (i=1, 2, ..., n) includes influences due to gravity, if the force Fi or the moment Mi is calculated using these positional deviations, the result may include an influence of gravity. Accordingly, when $<Fn+1^{(O)}>$ and $<Mn+1^{(O)}>$ are obtained for the respective joint Ji using the above mentioned equations (1), (2), at first the force Fi or the moment Mi from which an influence of the gravity was excluded must be obtained. The amount to be excluded can be calculated from the position and attitude data of the robot at a respective point of time, and a weight data and a length data of the robot arm and the like.

The base coordinate system $\Sigma 0$ expression of the external force Fn+1 to be applied to the end effector (for example, a tip of the burr removing tool) calculated by the above mentioned equations (1) and (2) based on the external force Fi and the moment Mi from which the influence of the gravity was excluded is shown with <F total> in FIG. 1 instead of $<Fn+1^{(O)}>$ used so far.

As shown in FIG. 1, it can be considered that the vector <F total> of the force applied to the tool is as the resultant force of the normal line component <FN> and the tangential line component <Fr> of the profiling object face $\Gamma$. By the way, since the normal line component <Fr> can be considered as a friction force, the absolute value thereof |<Fr>| becomes the product of the absolute value |<FN>| of the normal line component <FN> and a coefficient of dynamic friction μ. That is, $|<Fr>|=\mu|<FN>|$. Incidentally, supposing that a dynamical friction force does not act in a direction perpendicular to a moving direction of the robot, the vector <Fr> is included in a plane including the vector <F total> and the vector <FN>. And, it can be considered that a normal line of the above mentioned plane including these three vectors is perpendicular to the vector <H> representing a moving direction which is instructed to the robot.

In FIG. 1, since both directions of the vector <H> in the moving direction of the robot and the vector <F total> of the force applied to the tool is known, a plane including the vector <F total>, the vector <Fr> and the vector <FN> can be specified. And, if the vector <FN> is rotated by $\emptyset$=arctan μ in the plane, the rotated direction is identical with the direction of the vector <FN>, that is, a direction of the normal line vector <N>. Accordingly, if the coefficient of dynamic friction μ is previously given, the direction of the normal line vector <N> can be determined.

Calculating the rotation matrix for having a thus obtained direction of the normal line vector <N> coincide with the direction of the Z axis of the tool coordinate system, the attitude of the robot is controlled based on the calculated rotation matrix so that the direction of the normal line vector <N> and the direction of the Z axis of the tool coordinate system may coincide with each other. In that process, the positional deviation of an axis of each joint Ji changes.

And then, after this positional deviation is fixed, the positional gain of each axis which enables the force acting in the direction of the normal line vector <N> to be equal to the predetermined value W is obtained by the reverse transformation calculation. And, the positional gain of each axis is changed to the thus obtained value.

According to the above mentioned operation, the direction of the Z axis of the tool coordinate system coincides with the direction of the normal line vector <N>, and the condition that the normal line direction component of the force which the robot RB receives from the profiling object surface $\Gamma$ is identical with the predetermined value W is satisfied.

Further, in order to move the robot RB along the path proceeding from the teaching point P1 to P2 at an instructed velocity v, the moving direction (tangential direction of the above mentioned path) and the moving target position are decided at every processing cycle. Then, the amount which should be separately added to the deviation amount calculated by a positional deviation counting section (for example, error register) of a position control loop is calculated to move the robot RB along its moving direction toward the moving target position at the velocity v.

Incidentally, the tangential direction of the moving path, that is, the vector of the velocity v, is positioned in one plane including the vector proceeding from the point P1 to the point P2 and the normal line vector <N> of the profiling object face $\Gamma$ at the present time.

Also, the amount (the number of pulses) to be added to the positional deviation amount calculated in the positional deviation counting section of the positional control loop can be determined based on the friction force acting in a tangential direction of the object face $\Gamma$. This friction force can be calculated in the form of a constant vector pointing, for example, in a direction reverse to a moving direction of the robot (In FIG. 1, the direction of the moving direction vector <H> of the robot is reverse to that of the friction vector <Fr>.). The force which is the product of the positional deviation to which the addition processing has been performed and the positional gain is brought about at each axis of the robot, so that the robot moves at a predetermined speed v along a predetermined path against a friction of the object surface $\Gamma$.

BRIEF DESCRIPTION OF THE DRAWINGS

The foregoing and other objects and feature of the invention will become apparent from the following description of preferred embodiments of the invention with respect to the accompanying drawing, in which.

DETAILED DESCRIPTION OF THE PREFERRED EMBODIMENTS

Figure 2:
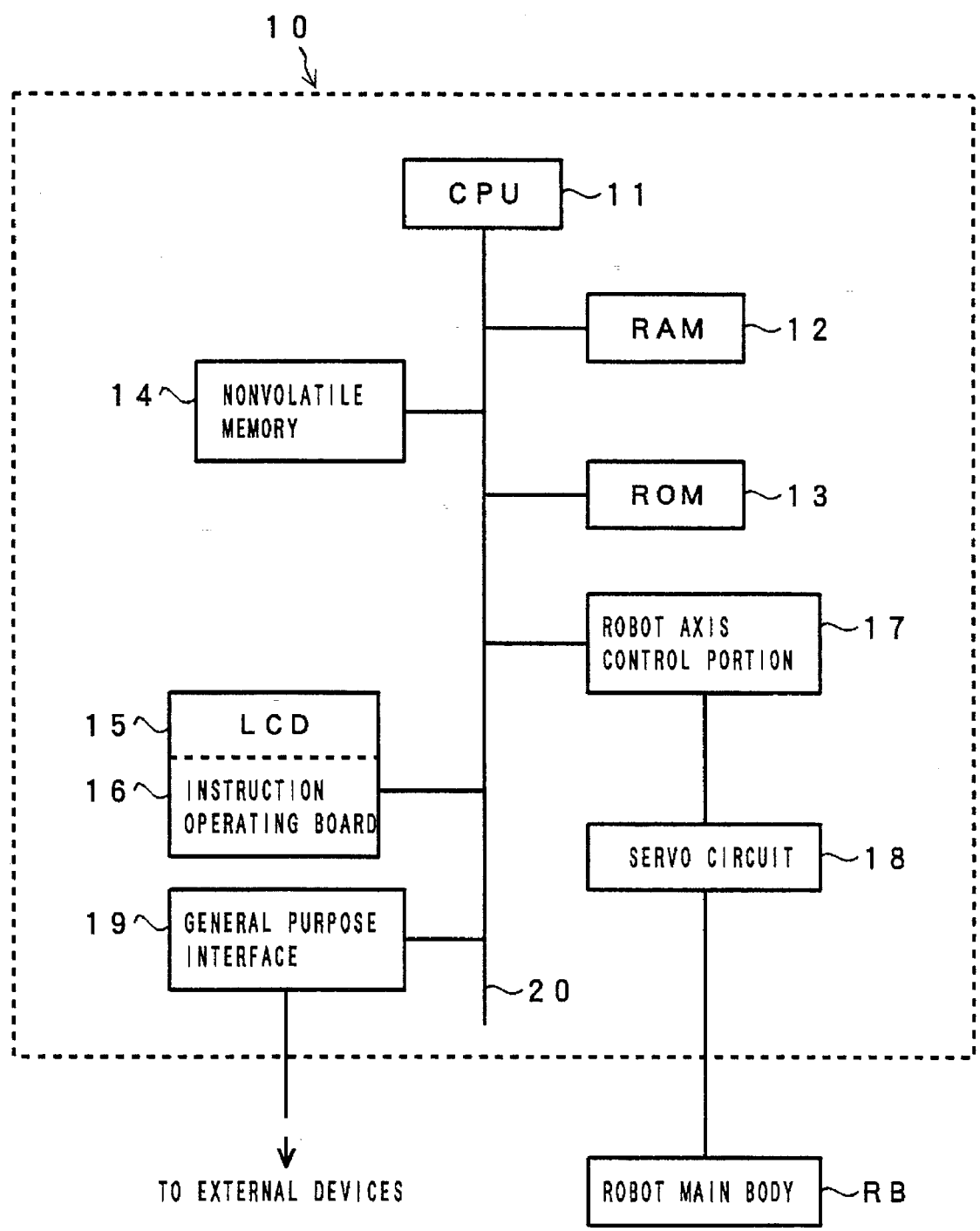
FIG. 2 is a block diagram of a main part of a robot controller for executing a control according to the present invention.

FIG. 2 is a block diagram of a main part of a robot controller for executing a robot profile control in accordance with the present invention;

In FIG. 2, a robot controller 10 has a central processing unit (CPU) 11. The CPU 11 is connected through a bus 20 with a memory 13 comprising RAM, a memory 12 comprising RAM a, a non-volatile memory 14 comprising a CMOS and the like, an instruction operating board 16 provided with an LCD (Liquid Crystal Display) 15, a robot axis control section 17 for controlling each axis of the robot, and a general purpose interface 19 for input and output operation with external devices such as an off-line programming device or the like, respectively.

The robot axis control portion 17 is connected to a robot main body RB through a servo circuit 18. In ROM 13, various kinds of programs which the CPU 11 executes in order to control the robot RB and the robot controller 10 by itself are stored. RAM 12 is a memory to be used for storing temporally and calculating data. In the non-volatile memory 14, the programs and various kinds of set values including instruction position data inputted from the instruction operating board 16 or the external device (not shown) are stored.

The above mentioned construction and function are not different basically from the conventional robot controller. However, in order to realize the profile control according to the present innovation, the programs and set values required for carrying out the processing as described hereinafter (a flowchart in FIG. 5) are stored in ROM 13 or the non-volatile memory 14.

The robot controller 10 executes a processing relating to the profile control by a software process. A block diagram of each axis in this profile control shown in FIG. 3.

Figure 3:
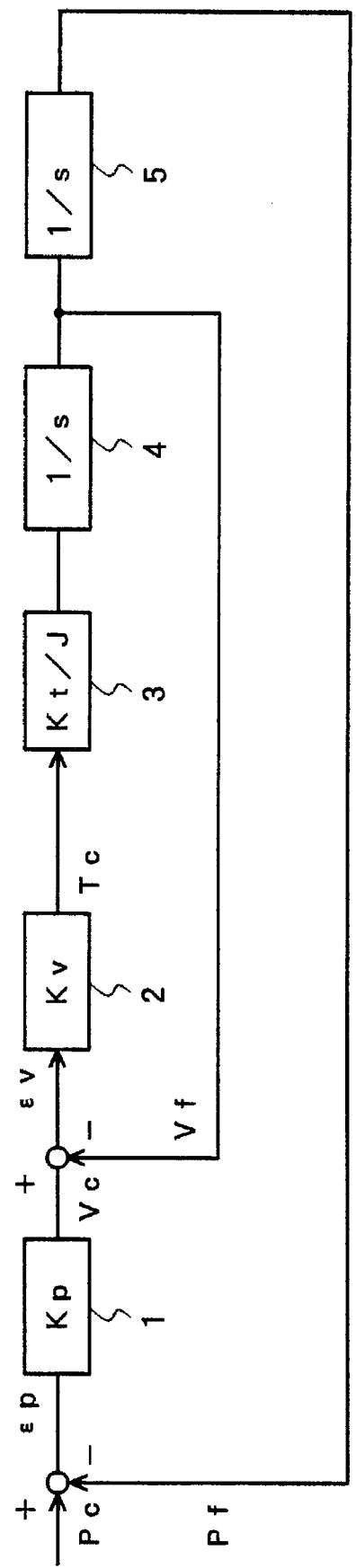
FIG. 3 is a block diagram of a profile control according to the present invention.

In FIG. 3, a reference numeral 1 denotes a transfer function of the positional loop, and a reference symbol Kp is a positional loop gain. Further, a reference numeral 2 is a transfer function defined with a constant, and a reference symbol Kv denotes a velocity loop gain. A reference numeral 3 denotes a transfer function of a system including a servo amplifier and a servo motor, a reference symbol Kt denotes a torque constant of the motor, and J is an inertia applied to a motor shaft. Also, reference numerals 4, 5 denote an integral processing executed in a shaft controller of the motor.

The axis control section 17 of the robot controller 10 obtains a speed command Vc by executing a positional control processing with the gain Kp based on a positional deviation ep between a position command Pc issued from the CPU 11 and the present position Pf obtained by integrating (block 5) the present speed value Vf. And, a speed control processing with the gain Kv is performed based on the deviation ev between the speed command Vc and the present speed value Vf to generate a torque command Tc, which is inputted to the servo amplifier.

And, the servo amplifier, receiving the torque command (current command) Tc, supplies the electric current corresponding to the torque command Tc to the motor to rotate it at a speed Vf.

The distinctive point of the present invention as compared with the conventional profile control is that the position gain Kp is changed on-line when performing a profile control according to the present invention.

An embodiment of the present invention will be described hereinafter with reference to FIG. 4.

Figure 4:
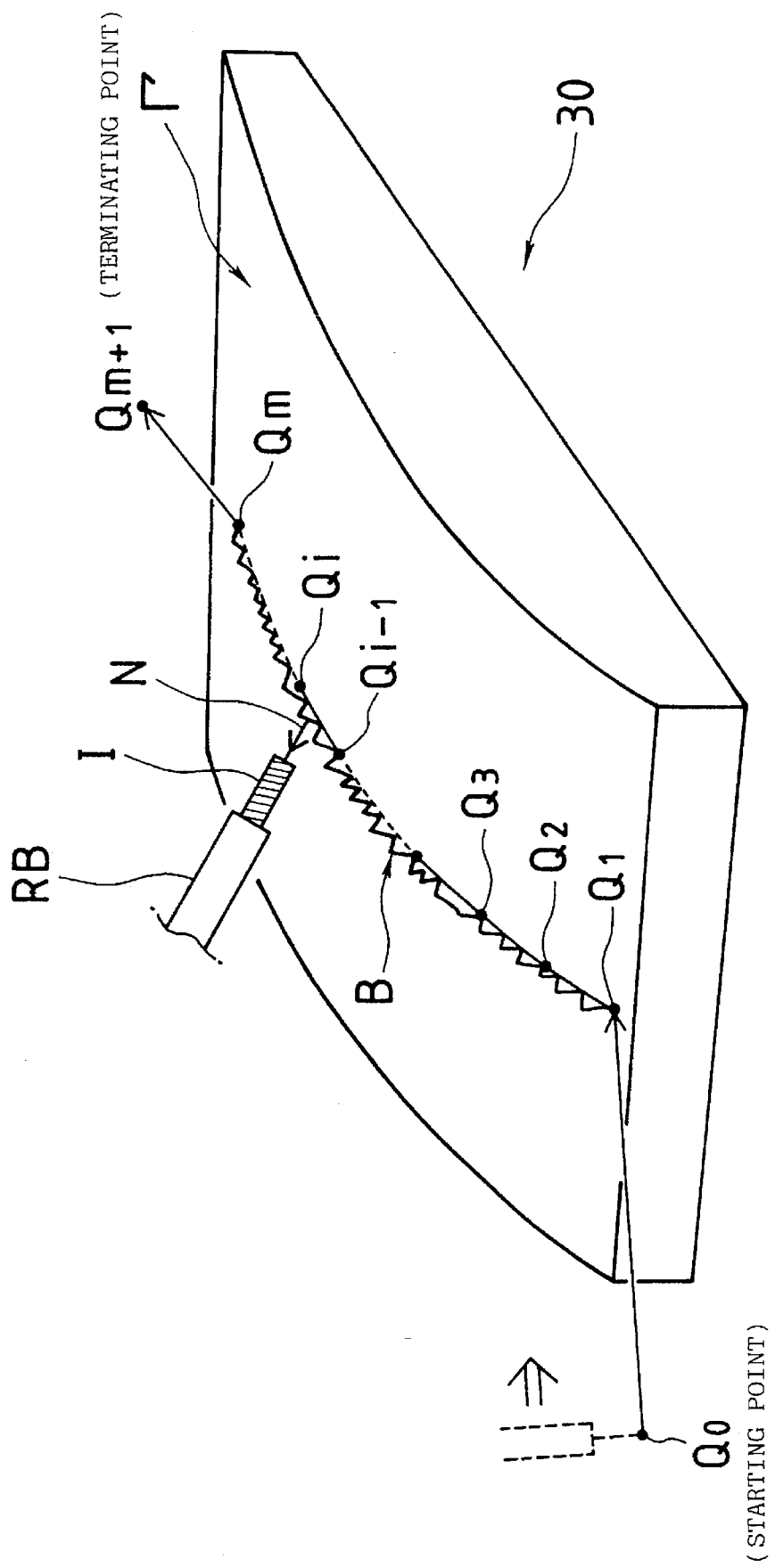
FIG. 4 is a schematic diagram explaining an example supposed in one embodiment of the present invention.

In FIG. 4, a reference numeral 30 denotes a workpiece having a curved surface $\Gamma$. A burr B to be removed is formed, extending in a line at the central portion of the curved surface $\Gamma$. Then, the robot RB, to which spline Q1–Qm along the burr B is instructed, starts to execute burr removing work. Point Q0 is set as a home position serving as an approaching point, and point Qm+1 is set as an escape point. Both of which are air cutting points.

Figure 1:
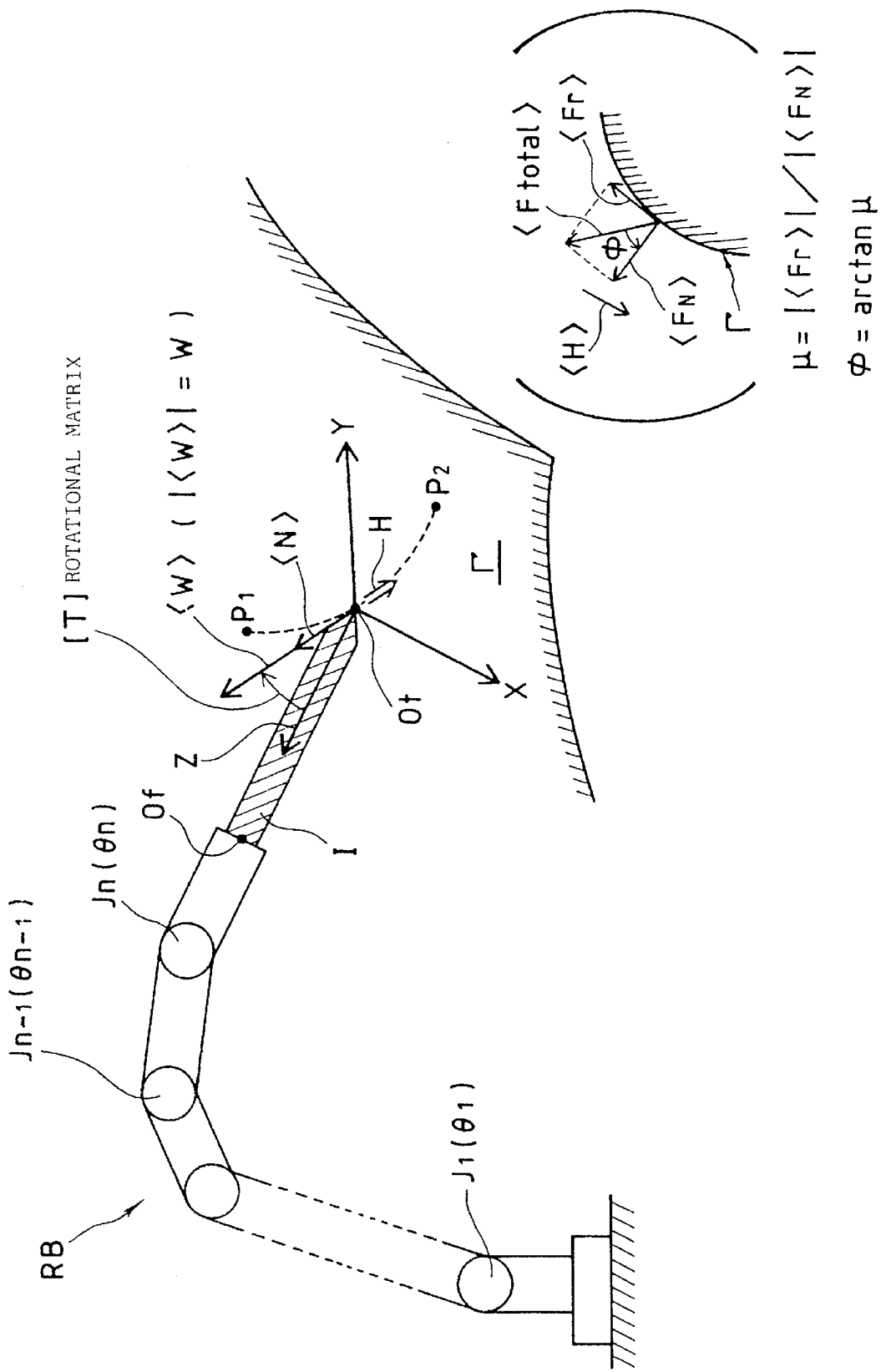
FIG. 1 comprises schematic diagram showing generally a robot for executing a profile control in order to explain the principle of the present invention.
Figure 5:
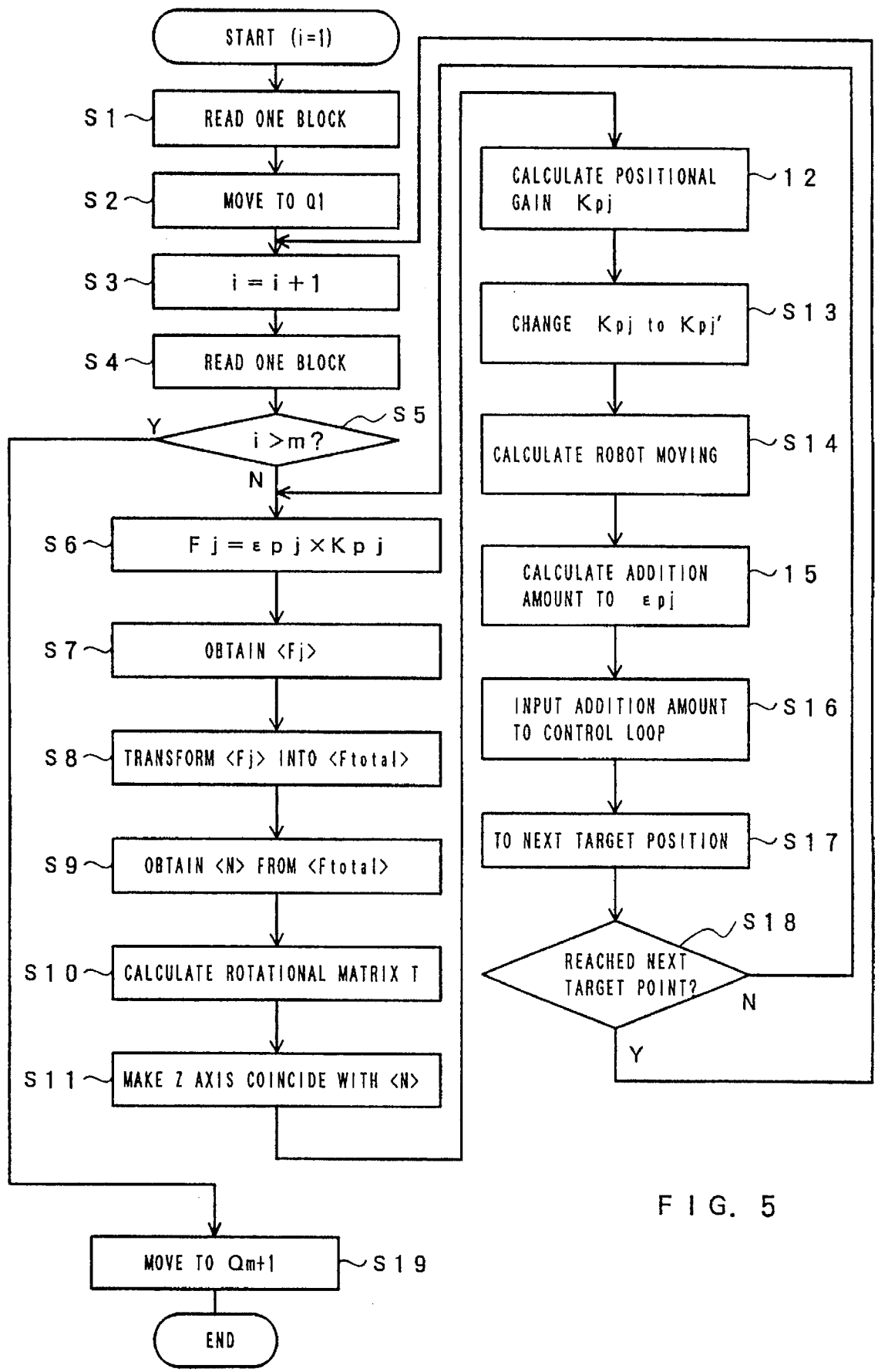
FIG. 5 is a flowchart showing an outline of a process to be performed by a CPU of a robot controller, in the case shown in FIG. 4.

Also, a tool coordinate system is set at the tip of the burr removing tool I supported on the robot RB in such a manner that the Z-axis direction is controlled so that it coincides with a normal line direction of the profiling object face $\Gamma$, as described by referring to FIG. 1. Further, it is assumed that the required set values such as the target value W which is an absolute value of the normal direction component $<W>$, normal to the object plane $\Gamma$, of the force which the robot RB receives from the burr removing object plane $\Gamma$ and the coefficient of dynamic friction $\mu$ were already stored in the non volatile memory 14 of the robot controller 10. Under this preparation, the process described in a flowchart in FIG. 5 is started.

The process is started in a state where a teaching point index i is initially set to 0, and the one block of the operation program is read to make the robot move to the position Q1(Step S1–Step S2). During this process, the profile control is not executed. Then 1 is added to the teaching point index i (Step S3), and the next one block is read (Step S4). Further, when confirmed that the present index i does not reach m, which is the index of the finishing point in the profile control (Step S5), the profile control is started.

First, the force Fj being applied to each axis Jj (j=1, 2, . . . , n) is obtained from the product of the positional deviation epj and the position gain Kpj of each axis (Step 6). And, a vector $<Fj>$ having components of force Fj as the many as number of axes is defined (Step S7), and then the vector $<Fj>$ is transformed into a vector $<F\ total>$ in the three-dimensional space (Step S8).

Next, the normal line vector $<N>$ of the profiling object plane $\Gamma$ at that position is obtained from the vector $<F\ total>$, the value of the coefficient of the dynamic friction $\mu$, and the direction (Qi→Qi+1) of the instruction line (Step S9).

Next, the rotation matrix T for having the direction of the normal line vector $<N>$ coincide with the Z axis direction of the tool coordinate system is calculated (Step S10). Then, based on the calculated result, the attitude of the robot is controlled so that the direction of the normal line vector $<N>$ and the Z axis direction of the tool coordinate system coincide with each other (Step S11). On this occasion, the positional gain of each axis is not subject to change.

Further, in a condition where the positional deviation is fixed, the positional gain Kpj' of each axis which would serve to makes the force acting in the direction of the normal line vector $<N>$ constant is obtained by a reverse transform operation (Step S12), to make the gain of each axis coincide with Kpj' (Step S13).

And, in order to move it toward the next teaching point Qi+1 at the instructed speed v of the robot RB, a tangential direction of the moving path at that position is obtained, and further, the moving target position of the robot RB in that direction is determined (Step S14).

And then, the amount to be added to the position deviation of each axis, which is required for moving the robot RB toward the moving target position of the robot at the instructed speed V, is calculated (Step S15). The calculated amount to be added is added to the positional deviation counting section (for example, error register) in the position control loop (Step S16). Based on the added value, the robot RB is moved to the moving target position (Step S17).

Next, the program returns to the step S3 or the step S6, according to whether or not the robot RB reaches the position corresponding to the next teaching point Qi+1. That is, if the robot RB does not reach the position corresponding to the next teaching point Qi+1, immediately the processes from the step S6 on are repeated. If the robot RB reaches the position corresponding to the next teaching point Qi+1, 1 is added to the teaching point index i (Step S3), and then next one block of the operation program is read (Step S4). And, when confirming that the robot RB does not reach the profile control finishing point Qm (step s) (Step S5), the processes from the step S6 on are repeated. When the robot RB reaches the profile control finishing point Qm, the profile control is finished, then the program proceeds from the step S5 to the step S19, and by moving the robot RB to the final teaching point Qm+1, one process cycle is finished.

Moreover, in the explanation of the above mentioned embodiment, the description relating to the timing of ON-OFF of the burr removing tool and the control of driving current are omitted. However, it is usually executed by controlling a burr removing tool controller (not shown) based on a command inserted into an operating program.

Also, in the present embodiment, there is explained a case in which the attitude of the tool (direction of the axis) is maintained parallel to the normal line of the object plane Γ. However, in a case where the attitude of the tool inclines with respect to the normal line of the profiling object plane Γ, a reproducing operation according to the above mentioned process may be executed on the condition that the setting direction (Z axis direction) of the tool coordinate system is inclined with respect to the direction of the tool axis. That is, if the reproducing operation according to the above mentioned process is executed on that condition, the control for maintaining the attitude of the tool coordinate system parallel to the normal line of the profiling object plane Γ is performed, with the result being that the attitude of the tool itself is kept inclined at a constant angle to the normal line of the profiling object plane Γ.

As described above, according to the present invention, the profile control is realized by the floating function owing to the software without mounting a sensor such as force sensor or distance sensor. Accordingly, a system of a low price and a high reliability can be assembled in the application where profile control is required.

What is claimed is:

1. A robot profile control method for a robot having axes and which performs profile control of a workpiece having a profiling object plane, comprising the steps of:

(a) executing a positional instruction and a moving speed command to the robot;

(b) obtaining a force applied to each axis of the robot from the product of positional deviation and positional gain at each axis;

(c) obtaining an external force applied to an end effector of the robot, which is represented as a vector in three-dimensional space, based on the forces being applied to each axis of the robot, obtained in the step (b);

(d) calculating a normal line vector of the profiling object plane based on the vector of the external force obtained in the step (c);

(e) controlling an attitude of the robot with the positional gain of each axis fixed, such that the direction of the tool coordinate system set in advance for the robot coincides with the direction of the normal line direction of the profiling object plane;

(f) calculating a positional gain of each axis which serves to make the component of the external force obtained in the step (c), in the direction of a normal line vector of the profiling object plane, a predetermined value and then changing the positional gain of each axis to the calculated value;

(g) determining a moving direction of the robot and a moving target position of the robot in the moving direction, based on the contents of the position instruction of the step (a) and the normal line vector of the profiling object plane; and (h) calculating an amount to be added to the positional deviation of each axis calculated at the positional deviation calculating section of the position control loop to realize the speed instructed in the step (a), and inputting the amount to be added to the positional deviation calculating section of each axis.

2. A robot profile control method according to claim 1, wherein the step (b) of obtaining the force being applied to each axis of the robot further comprises obtaining a force excluding the influence of the gravity is obtained by using position data and attitude data of the robot at each time point, weight data and length data of the robot arm.

3. A robot profile control method according to claim 1, wherein the calculation of the normal line vector of the profiling object plane in the step (d) is executed based on the robot moving direction determined in the step (g) and the dynamic friction force acting between the tool center point and the profiling object plane, as well as the external force vector obtained in the step (c).

4. A robot profile control method according to claim 1, wherein at least the steps from (b) to (g) are executed by a software process in a robot control device.

5. A robot profile control method according to claim 1, wherein the direction of one axis of the tool coordinate system is set to coincide with an axial direction of the axis of a tool supported on the robot.

6. A robot profile control method according to claim 1, wherein the direction of one axis of the tool coordinate system is set to be inclined to the axial direction of the tool supported on the robot.

* * * * *